Nov. 20, 1934.  J. F. DUBY  1,981,613
VEHICLE WHEEL SIDE THRUST INDICATOR
Filed Dec. 31, 1931
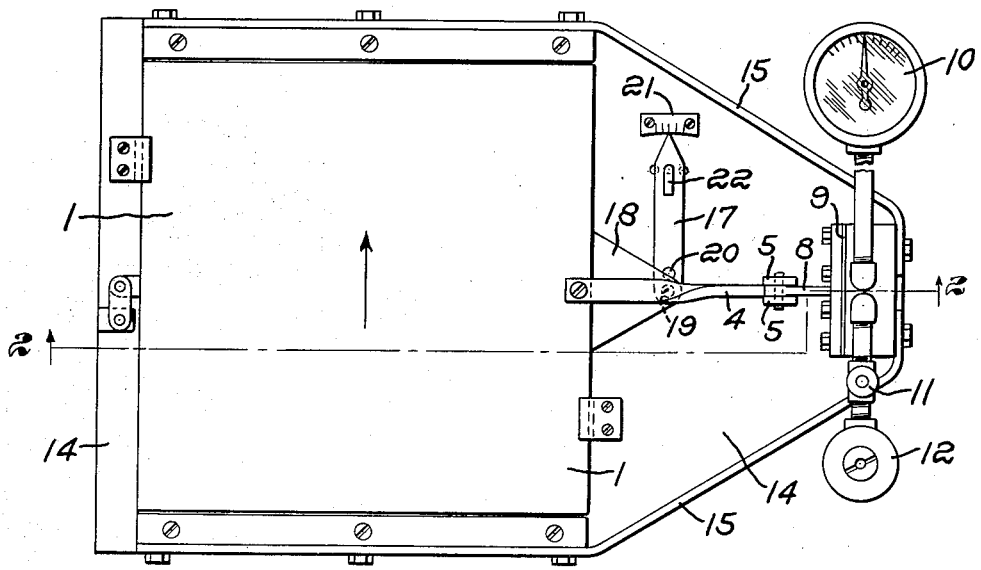
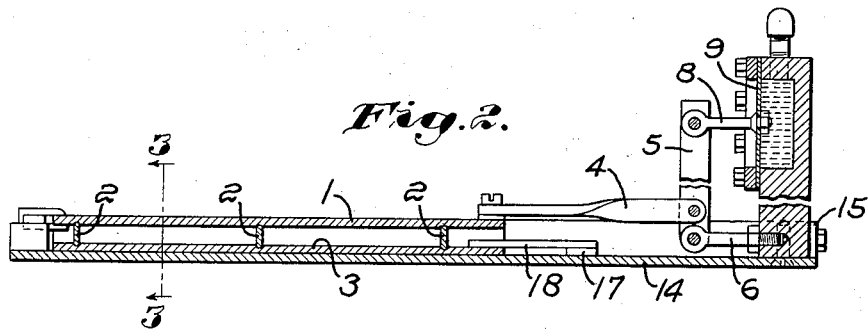
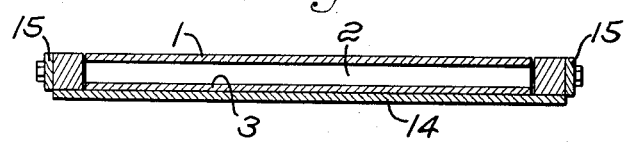
Inventor:
John F. Duby Patented Nov. 20, 1934

1,981,613

UNITED STATES PATENT OFFICE 1,981,613

VEHICLE WHEEL SIDE THRUST INDICATOR

John Fabien Duby, Dorchester, Mass.

Application December 31, 1931, Serial No. 584,144

9 Claims. (Cl. 265—47)

This invention has for its object, apparatus for indicating the strength of the side thrust force exerted by a pair of vehicle wheels as the vehicle travels forward, and also means to modify this force while making a test, by another force of which the weight of the vehicle is a component.

In the common type of platform gage the platen is freely movable in response to the directional tendency of a wheel, to the force caused by an accumulated distortion in the tire, or to a force caused by vehicle weight applied to the spindle at a point not in a plane directly above the point of tire and road contact. Any one or a combination of the above mentioned forces, may tend to move the platform to a position which will dispel the force, or forces, without giving any indication of the strength thereof; and free movement of the platform completely destroys the possibility of a test in accord with actual road conditions.

I provide means for indicating the force of the side thrust without allowing it to dispel itself, thereby maintaining substantially the same conditions during the test as exists when the tire is rolling along the road.

Due to axle construction and camber action, the directional tendency of a vehicle wheel is not necessarily in the same direction as a horizontal line lying in the center plane of the wheel and my device is influenced by this directional tendency. The wheels on some vehicles require side thrust to be exerted between the wheel and the ground when traveling in a straight line and also when traveling in an arc; the strength of the force required varies with the weight of the vehicle. When testing these vehicles, my apparatus may be adjusted so that the weight of the vehicle exerts a force which balances the side thrust force required and thereby becomes a factor in determining the presence of any undesirable side thrust. Wheels on other vehicles, with different axle design, require no side thrust force whether traveling in a straight line or an arc. On these vehicles weight is not a factor and when testing them my apparatus may be adjusted so that the vehicle weight does not enter into the test and any side thrust present can be measured. On some vehicles, the front wheels require side thrust while the rear wheels do not and my apparatus may be easily adjusted for either condition as the test is made.

My improved apparatus is comprised of a platen onto which one of a pair of wheels may be driven. If any undesirable side thrust is being exerted by the wheel, due to improper settings of the wheels or axles, it will exert a force on the platen in a direction transverse to that in which the vehicle is traveling, but any material movement of the platen is prevented and the strength of the force exerted to prevent movement is indicated. In the case of vehicles where side thrust bears a relation to vehicle weight, the apparatus may be so adjusted that the weight of the vehicle becomes a component of a force active on the platen in a horizontal direction transverse to the direction in which the vehicle is traveling and in the opposite direction from the desirable side thrust force.

If the desirable side thrust force is of the proper magnitude, it will counteract or neutralize the horizontal force caused by vehicle weight; therefore, there will be no exterior force necessary to prevent the platen from moving and if the side thrust force is not of the proper magnitude to exactly neutralize this horizontal force due to vehicle weight, an exterior force will be necessary to prevent movement of the platen and the magnitude of this exterior force is indicated.

It will be evident that a device of the nature disclosed herein will indicate only that side thrust force which is undesirable. This undesirable force is counteracted or neutralized by an exterior force and by measuring the magnitude of this exterior force I am able to detect the presence of any undesirable side thrust.

In the accompanying drawing, forming a part of the specification and in which is shown a preferred embodiment of the invention:

Figure 1 is a plan view of the apparatus.

Fig. 2 is a longitudinal section thereof on the line 2—2 of Fig. 1, and

Fig. 3 is a vertical cross-section on the line 3—3 of Fig. 2.

The under side of a platen 1 is provided with grooves to receive the top edges of supporting bars 2; the bottom edges of the bars rest in grooves provided in a base plate 3. The grooves are of such a nature as to allow a change in the angularity of the supporting bars away from vertical, as will be presently described.

Attached to the platen is a link 4 which is connected through a lever arm 5 to a fixed stud 6, whereby any force exerted on the platen 1 will be transferred through the linkage to stud 6 and thence to another stud 8. The stud 8 is mounted upon a diaphragm 9 which forms one end of an enclosed cylinder filled with liquid at atmospheric pressure. Any force exerted on the platen in either direction will either increase or decrease the pressure on the liquid, thus acting on a gage 10 which is capable of showing pressure above or below atmosphere. Graduations on the gage dial cooperate with a pointer to indicate a desired unit of pressure. Expansion or contraction of the liquid, due to atmospheric temperature changes, may be compensated for by opening a valve 11, which is normally closed, and allowing the liquid to flow into or out of a supply tank 12, thereby causing the liquid in the cylinder to assume atmospheric pressure.

The base plate 3 may rest on the floor of a bed plate 14 having an upstanding wall 15 forming a frame for the entire mechanism. The base plate 3 is connected to one end of an adjusting arm 17 by a plate 18 and a stud 19. The arm 17 is pivoted at 20 to the bed plate 14 and the other end of said arm is shaped to form a pointer adapted to cooperate with a scale plate 21 attached to the bed plate 14. A pin 22 extends through arm 17 and may engage apertures in the bed plate to lock said arm in the desired position with respect to scale 21. Any suitable means may be adapted to maintain the platen 1 in contact with its supporting members 2, as for example, overlapping plate members shown adjacent the inner and outer edges thereof in Fig. 1. A suitable link connection between the platen and bed plate 14 may be utilized to prevent any substantial movement of said platen in the direction of vehicle travel; such a connection is shown at the extreme left in Fig. 1.

It will be clear that movement of arm 17 about its fulcrum 20 will cause horizontal movement of the base plate 3 relative to the platen which will vary the vertical angle of the supporting bars 2 between the platen 1 and the base plate 3. With the bars adjusted at an angle away from vertical, any downward force on the platen, caused by vehicle weight, will exert a force in a horizontal direction, transverse to the direction of vehicle travel.

On cars so designed that vehicle weight bears a relation to the side thrust, the base plate 3 may be adjusted so that the supports are inclined at a definite angle away from vertical. This will cause a lateral force active on the platen in direct proportion to the vehicle weight. On cars where vehicle weight bears no relation to side thrust, the base plate 3 may be adjusted so that the bars 2 are in a vertical position, as shown. When the apparatus is adjusted in this manner, no side force will be exerted on the platen by vehicle weight.

The platen should be large enough to accommodate that part of the tire which is flattened by the weight of the vehicle but a larger platen will be satisfactory for all wheel sizes because the reading indicated by the gage 10, when full contact between the tire and platen is first made, will not change as the tire progresses across the platen, as would be the case if the platen were allowed to move freely in response to the force exerted.

My apparatus may be operated as follows: Assume that a wheel is traversing the platen in a direction indicated by the arrow in Fig. 1. In the case where side thrust bears a relation to vehicle weight, the base-plate is adjusted by arm 17 to set the angle of bars 2 a predetermined amount away from vertical. The vehicle wheel is then driven onto the platen and the weight of the vehicle will exert a force thereon in a horizontal direction transverse to the direction of vehicle travel. If the wheels are adjusted to the proper settings they will exert a force in the opposite direction which will neutralize the first mentioned horizontal force; therefore, there will be no force indicated in either direction.

For vehicles so designed that the weight thereof is not a factor in the amount of side thrust required, the arm 17 will be adjusted so that bars 2 will be disposed in vertical positions as shown and under these conditions the vehicle weight can not cause the horizontal force referred to; therefore, if there is no undesirable side thrust exerted by the wheel it will pass over the platen without exerting any pressure on the liquid and consequently no movement of the indicator. It is evident any undesirable side thrust will change the pressure of the liquid within the cylinder, hence, an indication on the gage of the side thrust magnitude.

My apparatus may be used for any size wheels, notwithstanding their angular relation to each other or their path of travel and regardless of tire size or any variation of air pressure.

The gage 10 may be located beyond the platen so that a driver may readily ascertain the indication from the seat.

It should be understood that the present disclosure is for the purpose of illustration only and that this invention includes all modifications and equivalents which fall within the scope of the appended claims.

I claim:

1. Indicating apparatus, comprising an element adapted to be utilized as a portion of the path for a vehicle wheel, restraining means associated therewith and adapted to cause the element to be sufficiently stable to prevent lateral distortions of a tire passing over the element from dispelling themselves to an extent which would materially affect the lateral forces exerted by said distortions, means to utilize the weight of a vehicle, when traversing the element, as a component to bring about a directional force on the element to oppose a side thrust force commonly exerted by the directional tendency of a vehicle wheel, and means to indicate the resultant force exerted in a direction lateral to the direction of vehicle travel as a wheel passes over the element.

2. Indicating apparatus, comprising an element adapted to be utilized as a portion of the path for a vehicle wheel, adjustable supporting members for said element adapted to utilize the weight of a vehicle, as it traverses the element to bring about a lateral force in a desired proportion to the vehicle weight, said force tending to move the element in a direction transverse to a wheel while traversing the element and means to compare the strength of said force with the usual side thrust force caused by the directional tendency of the wheel.

3. Indicating apparatus, comprising an element adapted to be utilized as a portion of the path for a vehicle wheel, supporting members for said element, means to position the supporting members so as to bring about a force, due to vehicle weight, which will tend to move said element in a direction transverse to a wheel while traversing the element, and means for measuring the resultant of said force and the usual side thrust force caused by the directional tendency of the wheel.

4. Indicating apparatus comprising an element adapted to be utilized as a portion of the path for a vehicle wheel, means associated therewith and adapted to utilize the vehicle weight to exert a side thrust force on the element when traversed by a vehicle wheel, means to adjust the last mentioned means to bring about desirable proportions between the vehicle weight and the side thrust force resulting therefrom, restraining means associated with said element and adapted to offer sufficient resistance to the element to make it sufficiently stable to restrain lateral distortional stresses in a tire rolling on the element in practically the same manner as they are restrained when the tire rolls on an ordinary road surface, and means to indicate the restraining force exerted by the restraining means as a wheel traverses the element.

5. Indicating apparatus comprising an element adapted to be utilized as a portion of the path for a vehicle wheel, means associated therewith and adapted to utilize the vehicle weight to exert a side thrust force on the element when traversed by a vehicle wheel, means to adjust the first mentioned means to a position which will make it non-responsive to vehicle weight, restraining means associated with said element and adapted to offer sufficient resistance to the element to make it sufficiently stable to restrain lateral distortional stresses in a tire rolling on the element in practically the same manner as they are restrained when the tire rolls on an ordinary road surface, and means to indicate the restraining force exerted by the restraining means as a wheel traverses the element.

6. Indicating apparatus comprising an element adapted to be utilized as a portion of the path for a vehicle wheel, restraining means associated with said element, said means adapted to resist horizontal movement of the element and make it sufficiently stable to restrain lateral distortional stresses in a tire rolling on the element in practically the same manner as they are restrained when a tire rolls on an ordinary road surface, and means to indicate the force exerted by the restraining means in maintaining stability against side thrust forces as the element is traversed by a vehicle wheel.

7. Indicating apparatus comprising an element adapted to be utilized as a portion of the path for a vehicle wheel, restraining means associated with said element and adapted to offer sufficient resistance to the element to make it sufficiently stable to restrain lateral distortional stresses in a tire rolling on the element in practically the same manner as they are restrained when the tire rolls on an ordinary road surface, and means to indicate the restraining force exerted by the restraining means as a wheel traverses the element.

8. Indicating apparatus comprising an element adapted to be utilized as a portion of the path for a vehicle wheel, means associated therewith and adapted to utilize the vehicle weight to exert a side thrust force on the element when traversed by a vehicle wheel, restraining means associated with said element, said means adapted to resist horizontal movement of the element and make it sufficiently stable to restrain lateral distortional stresses in a tire rolling on the element in practically the same manner as they are restrained when a tire rolls on an ordinary road surface, and means to indicate the force exerted by the restraining means in maintaining stability against side thrust forces as the element is traversed by a vehicle wheel.

9. Indicating apparatus comprising an element adapted to be utilized as a portion of the path for a vehicle wheel, means associated therewith and adapted to utilize the vehicle weight to exert a side thrust force on the element when traversed by a vehicle wheel, restraining means associated with said element, said means adapted to resist horizontal movement of the element and make it sufficiently stable to restrain lateral distortional stresses in a tire rolling on the element in practically the same manner as they are restrained when a tire rolls on an ordinary road surface, and means to indicate the restraining force exerted by the restraining means as a wheel traverses the element.

JOHN FABIEN DUBY.